United States Patent [19]

Keverian

[11] Patent Number: 4,613,987
[45] Date of Patent: Sep. 23, 1986

[54] IMAGE SCANNING ARRANGEMENT

[75] Inventor: Kenneth M. Keverian, Westfield, N.J.

[73] Assignee: AT&T Information Systems Inc., Holmdel, N.J.

[21] Appl. No.: 702,255

[22] Filed: Feb. 15, 1985

[51] Int. Cl.$^4$ .............................................. G06K 7/10
[52] U.S. Cl. ........................................ 382/65; 382/66
[58] Field of Search ............................ 382/65, 66, 57; 250/227

[56] References Cited

U.S. PATENT DOCUMENTS 4,201,978  5/1980  Nally ...................................... 382/57
4,281,313  7/1981  Boldridge, Jr. ..................... 250/227
4,343,991  8/1982  Fujiwara et al. .................... 250/227

Primary Examiner—David K. Moore
Assistant Examiner—Jacqueline Todd
Attorney, Agent, or Firm—Ronald D. Slusky

[57] ABSTRACT

A light-transmissive device, illustratively a glass plate, is disposed adjacent to a plurality of light-emissive pixel locations, illustratively the pixel locations of a cathode ray tube (CRT). The glass plate entraps light originating from the CRT at least when an object, such as a document, is placed on one of the surfaces of the light-transmissive device, the amount of light that is entrapped being a function of the reflectivity characteristics of the document. The pixel locations are successively energized and a light detection signal indicative of the level of the entrapped light is generated by photodetection circuitry disposed adjacent to the edge of the glass plate. A pixel signal is stored for each energized pixel location, that signal being a function of the level of the light detection signal during the time that that pixel location was energized. The ensemble of stored pixel signals can then, for example, be displayed.

9 Claims, 2 Drawing Figures

IMAGE SCANNING ARRANGEMENT

BACKGROUND OF THE INVENTION

The present invention relates to scanners such as are used to scan documents.

It has long been realized that it would be advantageous to provide a scanner, such as is used to scan documents, which has no moving parts. However, many of the arrangements thus far devised to realize this objective have been relatively complex and/or expensive.

SUMMARY OF THE INVENTION

The present invention is directed to a scanning arrangement which is relatively inexpensive and quite simple to implement. In a scanning arrangement embodying the principles of the invention, a light-transmissive device, such as a glass plate, is disposed adjacent to a plurality of light-emissive pixel locations. The light-transmissive device is adapted to entrap light originating from the pixel locations at least when an object is placed on one of the surfaces thereof, the amount of light that is entrapped being a function of the reflectivity characteristics of the surface of the object. The pixel locations are successively energized and a light detection signal indicative of the level of the entrapped light is generated. A pixel signal is stored for each energized pixel location, that signal being a function of the level of the light detection signal during the time that that pixel location was energized. Advantageously, the invention requires no moving parts and an arrangement embodying the principles of the invention can be manufactured as an adjunct to a standard display device, such as a cathode ray tube.

DETAILED DESCRIPTION

Figures 1, 2:
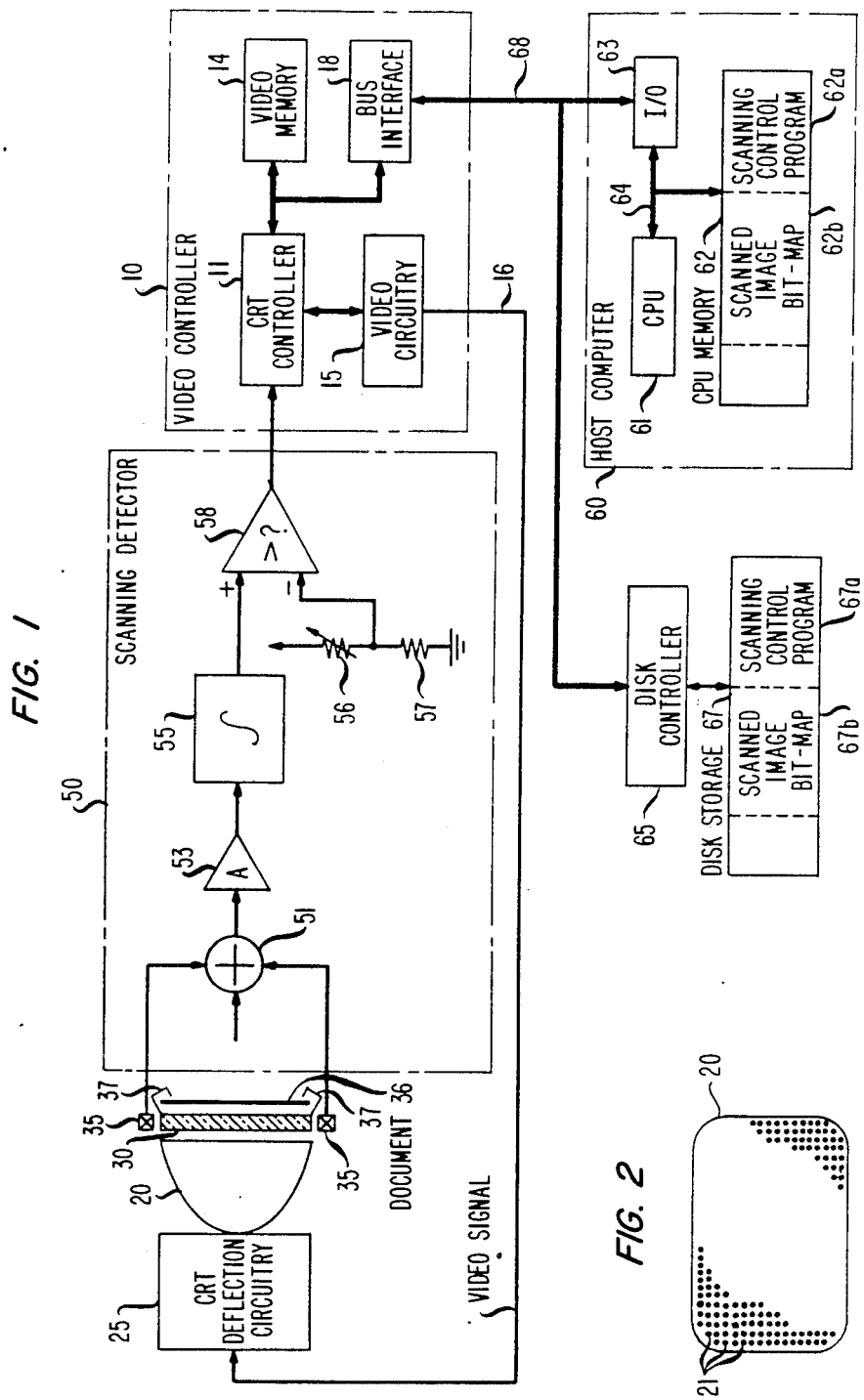
FIG. 1 is a block diagram of a system embodying the principles of the invention.
FIG. 2 depicts the front of a display device used in the system of FIG. 1.

The present invention builds upon the concepts embodied in the arrangement disclosed in U.S. Pat. No. 4,484,179 issued Nov. 20, 1984 to L. R. Kasday, which is hereby incorporated by reference. The Kasday patent, more particularly, is directed to a touch-sensitive display arrangement comprising, in preferred embodiments, a raster-scanned display device, such as a cathode ray tube (CRT), a light-transmissive device, such as a glass plate, adjacent to the face of the CRT, and a flexible membrane placed on top of the glass plate. When the membrane is touched at a particular location, an increased amount of the light emitted by the CRT at that location is trapped within the glass. This causes an increase in the electrical output of a group of photodiodes disposed at the edges of the glass plate. This increase in photodiode output is correlated with the (known) CRT raster position to determine where the screen was touched.

The present invention also uses the notion of trapping light emitted by a raster-scanned light source. In accordance with the invention, I have discovered that if a surface of an object, such as a printed document, is placed in contact with the light-transmissive device, the amount of light entrapped within the light-transmissive device is a function of the reflective characteristics of that surface. In particular, more of the light generated by the light source that strikes relatively bright areas of the object is reflected back into, and entrapped within, the light-transmissive device, than the light that strikes relatively dark areas of the object. My invention takes advantage of this phenomenon to generate a signal representing the patterns of light and dark on the object, such as those representing text printed on a document. The signal thus generated can be, for example, immediately displayed, stored or processed in any desired way. Inasmuch as there is no "touching" of the screen as in Kasday, the flexible membrane used in preferred embodiments of the Kasday arrangement is not necessary in implementing the present invention.

Turning, now, to the illustrative embodiment, the document scanning system of FIG. 1 includes a display device having a plurality of individually energizable light-emissive pixel locations, the display device illustratively being a raster-scanned cathode ray tube (CRT) 20, having pixel locations 21 (FIG. 2) and associated deflection circuitry 25. A light-transmissive device in the form of a glass plate 30 having first and second spaced-apart, illustratively parallel, surfaces is spaced a small distance away from the face of CRT 20 and a plurality of photodiodes and associated circuitry 35 is disposed adjacent to the edge of plate 30.

The system further includes a host computer 60 which includes a CPU 61 and CPU memory 62. The CPU communicates with memory 62 via a bus 64 and communicates with elements outside of the computer proper via I/O interface 63 and bus 68. Those outside elements include a disk controller 65, which controls disk storage unit 67 and also includes a video controller 10. The latter, more particularly, includes CRT controller 11, video memory 14, video circuitry 15 and bus interface 18, all of which are standard, off-the-shelf items. CRT controller 11, in particular, is operative to read from video memory 14 bit maps of "0"s and "1"s corresponding to patterns of "on" and "off" pixels desired to be displayed on CRT 20 for successive vertical scans. The CRT controller applies those "0"s and "1"s, along with, for example, horizontal and vertical sync signals to video circuitry 15. The latter combines these signals to generate on lead 16 an analog composite signal in a format usable by CRT deflection circuitry 25.

The system also includes scanning detector 50. Adder 51 therewithin combines the outputs of the individual photodetectors within photodetector circuitry 35 to generate a signal indicative of the amount, or level, of CRT-generated light trapped within glass plate 30 at any given time. In order to enhance the signal-to-noise ratio of this signal, it is passed through amplifier 53 and then integrator 55. The latter integrates the output of amplifier 53 for a time no greater than the time between the energizing of successive pixels on the CRT during the "scan" phase of system operation, as described below.

The integrator output signal is compared by a threshold circuit 58 to a threshold level defined by the relative magnitudes of voltage-divider resistors 56 and 57. The value of resistor 56 is illustratively set at the time of manufacture, although it could be made user-controllable. The output of comparator 58 is indicative of whether that portion of the surface of the object being scanned, i.e., that portion thereof that is adjacent to the currently energized pixel of the CRT, is relatively bright or relatively dark.

When a user desires to have a document scanned, he/she first places the document, denoted as 36, on plate 30 against which it may be held in any convenient way such as via clips 37. The user then issues a command (such as via a keyboard (not shown)) to CPU 61 requesting the execution of a scanning control program 67a illustratively stored in a file in disk storage 67. That program is thereupon provided to computer 60 via disk controller 65, bus 68, and I/O interface 63 and is ultimately stored in CPU memory 62, the copy being designated 62a. The scanning control program then begins the scan phase of its execution, wherein it causes CPU 61 to continually write into video memory 14 the pattern of "0"s and "1"s corresponding to the pattern of CRT pixels that are to be energized during successive vertical scans. For reasons that are discussed hereinbelow, physically adjacent pixels are not sequentially energized during the scan phase. Thus a number of different bit maps are written into memory 14 over a corresponding number of vertical scans until each pixel has been energized one time.

In addition to the scanning control program, a bit map 62b of the document being scanned is also maintained in memory 62. This bit map is created as follows: Initially, all the bits in the bit map are set to "0". Whenever the pixel being energized is adjacent to a spot on the document that is relatively dark, the level on the output lead of comparator 58 changes from a high to a low state, thereby signaling CRT controller 11 on the latter's "light pen" input that the currently scanned spot of the document is dark. The CRT controller thereupon issues an interrupt to CPU 61, in response to which the CPU reads the address of the currently scanned pixel from the CRT controller over bus 68. The CPU thereupon stores pixel signal in the form of a binary "1" in the appropriate location in the aforementioned bit map maintained in memory 62, thereby indicating that the corresponding spot on the document being scanned is relatively dark.

Once the entire document has been scanned, the scanning control program might, for example, cause the CPU to sound its "beeper," thereby indicating to the user that document 36 can be removed from glass plate 30. The user is then given the option of having the scanned image displayed on the CRT screen and/or stored in disk 67 for later retrieval. Assuming that the former option is chosen, CPU 61 causes bit map 62b stored in memory 62 to be transferred to video memory 14 whereupon the image, as represented by the bit map, appears on the CRT. If the user indicates to CPU 61 that the scanned image is to be saved, the CPU causes the map 62b to be copied into disk 67.

The particular characteristics of the scanning light source must be taken into account in designing a system embodying the principles of the invention. For example, when the raster light source is a CRT, as is in the present illustrative embodiment, the decay time of the CRT phosphor must be taken into account. In particular, the light emitted by the phosphor at a particular pixel must be allowed to decay before another pixel is energized. Otherwise, the signal at the output of integrator 55, instead of representing the light reflected from a single particular spot on the document, will, undesirably, represent the light reflected from two or more spots. One way to achieve this is to scan the image n times and, for each of the n scans, energize a different set of pixels, n being selected such that the time required for the electron beam to be moved from one pixel location to another is no less than the phosphor decay time. Assume, for example, a pixel resolution of $640 \times 400$, and a 60 Hz vertical scan rate. This yields a time of about $65 \times 10^{-9}$ sec between the scanning of adjacent pixels. If the selected phosphor is, for example, the standard P4 phosphor, which has a decay time of $10^{-4}$ sec, each successively energized pixel should, at least in theory, be separated by no less than about 1540 pixels, i.e., 2.4 horizontal lines. This means that about 1540 vertical scans will be required to scan the document at a total scan time of about 26 seconds. Notwithstanding the theory, however, I have observed in practice that it may be possible to have the successively energized pixels be closer together without noticeably degrading the performance of the system.

As another example, assume the same pixel resolution and vertical scanning rate, but a phosphor decay time of $160 \times 10^{-9}$ sec, such as is provided by the standard P46 phosphor. Here successively energized pixels could, in theory, comprise every third pixel on each scan line. Typical CRT controllers, however, are capable of signaling the occurrence of successive pulses occurring at their light pen inputs only if those pulses are separated by at least 8 pixels, this being the standard character width. As a practical matter, then, this limits the pixel energization rate to one pixel in every 8. This, in turn, would require 8 vertical scans of the document, yielding a total scan time of $8 \times 1/60 = 0.133$ sec.

As a further practical matter, however, the decay time of the P46 phosphor will typically be too short for applications in which, as in the present illustrative embodiment, the raster-scanned light source is also used to display the scanned image; decay times significantly longer than $160 \times 10^{-9}$ are needed to present an easily viewable image.

Another consideration in the design of a system embodying the principles of the invention is the fact that in some embodiments including, again, typical CRT embodiments, the document will be somewhat spaced apart from the actual light source, e.g., the inside face of the CRT envelope, by the intervening layer or layers of glass. If nothing else were done, the light emitted from a particular energized pixel would thus spread somewhat before impinging on the document being scanned, thereby limiting the resolution with which the information on the document could be recorded.

One possible way of dealing with this situation is to interpose a focusing device between the light source and the glass plate thereby narrowing down the size of the light spot impinging on the document. Such a focusing device could be, for example, the material known as SELFOC marketed by NSG America, Inc. SELFOC is typically available in strip, rather than sheet, form. Thus in use, a document to be scanned would be physically moved across the field of the SELFOC strip, either by hand or via a motor. If the display surface is curved, as is typically the case for CRTs, the SELFOC strip or sheet would preferably be shaped to conform to the display surface contour and the document would be held in such a way as to also conform to that contour.

A possible embodiment employing a SELFOC strip in the manner described above might include, in addition to the strip itself, a pair of glass plates on one of which is mounted the SELFOC strip, and a set of hand- or motor-driven rollers for guiding and driving the document to be scanned between the glass plates. The entire assembly could be hinged to the CRT housing in such a way as to be able to be swung down into place when needed and swung out of the way when not needed. This approach would advantageously add a document scanning feature to a CRT display at relatively modest incremental cost.

The foregoing merely illustrates the principles of the invention. For example, in some embodiments the light-transmissive device might be the face of the CRT envelope itself. In addition, the invention can be used in conjunction with alternatives to the CRT such as a scanning laser beam, plasma display panel, etc. Moreover, the invention can be used to scan not only opaque documents but transparencies, as well. Moreover, by using appropriate photodetectors and/or filters, color images could also be scanned.

It will thus be appreciated that those skilled in the art will be able to devise various arrangements which, although not explicitly discussed herein, embody the principles of the invention.

What is claimed is:

1. A scanning arrangement for use in conjunction with a display device having a plurality of individually energizable light-emissive pixel locations, said arrangement comprising light-transmissive means adapted to be adjacent to said display device and having first and second spaced-apart, generally parallel surfaces, said light-transmissive means being adapted to entrap between said surfaces by internal reflection light originating from energized ones of said pixel locations at least when a surface of an object is placed on said second surface, the amount of light that is entrapped being a function of the reflectivity characteristics of said surface of said object, detection means for generating a light detection signal indicative of the level of said entrapped light, means for causing said device to successively energize at least ones of said pixel locations, and means for storing for each of said energized pixel locations a pixel signal which is a function of the level of said light detection signal during the time that said each of said pixel locations was energized.

2. The invention of claim 1 wherein the pixel signal stored for an individual one of said energized pixel locations has a first value when said light detection signal was greater than a predetermined threshold during the time that said individual pixel location was energized and a second value when said light detection signal was less than said predetermined threshold during the time that said individual pixel location was energized.

3. The invention of claim 1 further comprising means for applying the pixel signals stored by said storing means to said display device.

4. A scanning arrangement comprising a plurality of light-emissive pixel locations, light-transmissive means adjacent to said pixel locations and having first and second spaced-apart, generally parallel surfaces, said light-transmissive means being adapted to entrap between said surfaces by internal reflection light originating from energized ones of said pixel locations at least when a surface of an object is placed on said second surface, the amount of light that is entrapped being a function of the reflectivity characteristics of said surface of said object, detection means for generating a light detection signal indicative of the level of said entrapped light, means for causing said device to successively energize at least ones of said pixel locations, and means for storing for each of said energized pixel locations a pixel signal which is a function of the level of said light detection signal during the time that said each of said pixel locations was energized.

5. The invention of claim 4 wherein the pixel signal stored for an individual one of said energized pixel locations has a first value when said light detection signal was greater than a predetermined threshold during the time that said individual pixel location was energized and a second value when said light detection signal was less than said predetermined threshold during the time that said individual pixel location was energized.

6. The invention of claim 4 further comprising means for applying the pixel signals stored by said storing means to said display device.

7. A method for use in a scanning arrangement which includes a display device having a plurality of individually energizable light-emissive pixel locations, said arrangement comprising light-transmissive means adapted to be adjacent to said display device and having first and second spaced-apart, generally parallel surfaces, said light-transmissive means being adapted to entrap between said surfaces by internal reflection light originating from energized ones of said pixel locations at least when a surface of an object is placed on said second surface, the amount of light that is entrapped being a function of the reflectivity characteristics of said surface of said object, detection means for generating a light detection signal indicative of the level of said entrapped light, and means for causing said device to successively energize at least ones of said pixel locations, said method comprising the step of storing for each of said energized pixel locations a pixel signal which is a function of the level of said light detection signal during the time that said each of said pixel locations was energized.

8. The invention of claim 7 wherein the pixel signal stored for an individual one of said energized pixel locations has a first value when said light detection signal was greater than a predetermined threshold during the time that said individual pixel location was energized and a second value when said light detection signal was less than said predetermined threshold during the time that said individual pixel location was energized.

9. The invention of claim 7 comprising the further step of applying the pixel signals stored by said storing means to said display device.

* * * * *